(12) United States Patent
Russell

(10) Patent No.: US 9,508,103 B2
(45) Date of Patent: Nov. 29, 2016

(54) DEFERRED SOCIAL NETWORK CHECK-IN

(71) Applicant: Google Inc., Mountain View, CA (US)

(72) Inventor: Robert John Russell, Cupertino, CA (US)

(73) Assignee: Google Inc., Mountain View, CA (US)

( * ) Notice: Subject to any disclaimer, the term of this patent is extended or adjusted under 35 U.S.C. 154(b) by 440 days.

(21) Appl. No.: 13/720,965

(22) Filed: Dec. 19, 2012

(65) Prior Publication Data
US 2014/0172980 A1 Jun. 19, 2014

(51) Int. Cl.
| H04L 29/06 | (2006.01) |
| G06Q 50/00 | (2012.01) |
| G06Q 10/10 | (2012.01) |
| G06Q 30/02 | (2012.01) |

(52) U.S. Cl.
CPC ............. *G06Q 50/01* (2013.01); *G06Q 10/10* (2013.01); *G06Q 30/0261* (2013.01); *G06Q 30/0271* (2013.01)

(58) Field of Classification Search
CPC .............................. G06Q 50/01; G06Q 10/10
USPC ....................................................... 709/204
See application file for complete search history.

(56) References Cited

U.S. PATENT DOCUMENTS

| 8,725,569 | B2 * | 5/2014 | Liang ...................... H04W 4/02 705/14.49 |
| 9,311,683 | B1 * | 4/2016 | Saylor ..................... H04L 67/22 |
| 2007/0047782 | A1 * | 3/2007 | Hull ................... G06K 9/00442 382/124 |
| 2010/0261502 | A1 * | 10/2010 | Martin-Cocher et al. . 455/556.1 |
| 2011/0145052 | A1 | 6/2011 | Lin et al. |
| 2011/0276396 | A1 * | 11/2011 | Rathod ...................... 705/14.49 |
| 2012/0187184 | A1 * | 7/2012 | Challa et al. ................. 235/375 |
| 2012/0197709 | A1 * | 8/2012 | Kendall et al. ............ 705/14.36 |
| 2012/0197724 | A1 | 8/2012 | Kendall |
| 2012/0211557 | A1 * | 8/2012 | Harris ........................... 235/375 |
| 2012/0308077 | A1 * | 12/2012 | Tseng ..................... G06Q 50/01 382/103 |
| 2012/0313777 | A1 * | 12/2012 | Zazula ..................... 340/539.13 |
| 2013/0191251 | A1 * | 7/2013 | Martin et al. .............. 705/26.61 |
| 2013/0191394 | A1 * | 7/2013 | Bradley et al. ............... 707/738 |
| 2014/0012909 | A1 * | 1/2014 | Sankar et al. ................ 709/204 |
| 2014/0059132 | A1 * | 2/2014 | Shelton et al. ............... 709/204 |
| 2014/0128105 | A1 * | 5/2014 | Su ......................... H04W 4/021 455/456.3 |
| 2014/0156417 | A1 * | 6/2014 | Biswas et al. ............. 705/14.66 |

FOREIGN PATENT DOCUMENTS

| KR | 10-1015991 B1 | 2/2011 |
| KR | 10-2012-0124135 | 11/2012 |
| WO | WO-2012/030588 A2 | 3/2012 |
| WO | WO-2012/121950 A1 | 9/2012 |

* cited by examiner

*Primary Examiner* — Brian J Gillis
*Assistant Examiner* — Steve Lin
(74) *Attorney, Agent, or Firm* — McDermott Will & Emery LLP

(57) ABSTRACT

A system and method is disclosed for sharing previously visited locations in a social network. A mobile computing device (for example, a smartphone) may be configured to receive and transmit a token to a server, the token including event information related to an event at a previously visited location. One or more candidate places of interest are then determined based on the event information, and provided for display to a user of the mobile computing device. The user selects one or more selected places of interest from the candidate places of interest, and the server provides, for display to one or more other users in a social network, a representation of the user and the selected places of interest.

20 Claims, 7 Drawing Sheets

DEFERRED SOCIAL NETWORK CHECK-IN

BACKGROUND

The subject technology relates generally to location-aware and navigational devices. Location-aware smart phones and other devices have been integrated with interactive location services to provide users the ability to view their current locations, and the current locations of their friends. In this manner, a user may view the current location(s) of the user's friends in real time. Location-aware devices may also be integrated with a "check-in" feature that enables a user to select, in real-time, a place of interest near the user's current geographic location to announce to other users (for example, in a social network) where the user is currently located.

SUMMARY

The subject technology provides a system and computer-implemented method for indicating to members of a social network that a user previously visited a place of interest based on a token obtained from an event at the place of interest. According to one aspect, a computer-implemented method may include receiving a token at a computing device, the token including event information related to an event at a previously visited location, determining, in response to receiving the token, one or more candidate places of interest based on the event information, providing the one or more candidate places of interest for display to a first user, receiving, from the first user, one or more selected places of interest, selected from the one or more candidate places of interest, and providing, for display to one or more second users of a social network, a representation of the first user and the selected places of interest. Other aspects include corresponding systems, apparatuses, and computer program products for implementation of the computer-implemented method.

The previously described aspects and other aspects may include one or more of the following features. For example, receiving the token may comprise activating an integrated camera associated with the computing device as a barcode scanner, waiting for a barcode to be viewed by the integrated camera, and, on the integrated camera viewing a barcode that includes the event information, electronically reading the barcode to read the event information, and electronically storing the event information in a memory associated with the computing device. Receiving the token may comprise positioning a near field communication (NFC) device embedded within the computing device near a radio-frequency identification (RFID) transmitter, the RFID transmitter transmitting the event information, and receiving the event information into the computing device using the NFC device. Receiving the token may comprise providing to a user, in connection with a graphic user interface, an input for receiving the event information, and receiving, at the input, the event information in the form of a user-provided code. Receiving the token may comprise providing to a user, in connection with an activity stream, one or more input controls for receiving the event information, and receiving, at the one or more input controls, the event information in connection with a user-provided message posted to the activity stream.

The event information may include a code, and wherein determining one or more candidate places of interest comprises indexing, using the code, a plurality of records corresponding to respective events to identify at least one candidate event. In this regard, the method may further comprise determining, from the at least one candidate event, one or more establishments associated with the event. The token may be received in connection with a user account, the method further comprising determining, in response to receiving the one or more selected places of interest, one or more offerings, and providing the one or more offerings to a user of the user account. The computing device may be a mobile computing device associated with a user, or a server associated with the social network. The representation may be provided as one or more posts to a message stream.

In another aspect, a machine-readable medium may include instructions stored thereon that, when executed by a processor, cause a machine to perform a method of indicating to members of a social network that a user previously visited a place of interest based on a token obtained from an event at the place of interest. In this regard, the method may include receiving an event code related to a previously concluded event, determining, based on the event code, the previously concluded event, receiving, from a user, confirmation that the user was at the previously conducted event, and providing, for display to other users of a social network, a representation of the user and the previously conducted event. Other aspects include corresponding systems, apparatuses, and computer program products for implementation of the machine-readable medium.

The previously described aspects and other aspects may include one or more of the following features. For example, receiving the event code may comprise scanning at least a portion of a tangible document to electronically read the event code from the document. Receiving the event code may comprise receiving the event code as part of a wireless signal transmitted from a near field transmitter. The event code may be received at an interactive user interface provided by a computing device.

The event code may be received from multiple users of the social network. In this regard, the method may further comprise associating, in the social network, the multiple users with the previously concluded event, and displaying the association in one or more activity streams. The event code may be received in connection with a user account. In this regard, the method may further comprise determining, in response to receiving the confirmation, one or more offerings for a user of the user account, and providing the one or more offerings to the user of the user account. The event code may be received at a mobile computing device associated with the user. The event code may be received at a server device associated with the social network, the server device receiving the event code over a network from a mobile computing device associated with the user.

In a further aspect, a system may include a processor and a memory. The memory may include instructions that, when executed by the processor, cause the processor to facilitate the steps of receiving a digital token from a mobile computing device, the digital token comprising information related to a previously concluded event, determining, based on the information, the previously concluded event, receiving, from a first user, confirmation that the first user was at the previously conducted event, and providing, to a modified social media check-in service, an instruction to check-in the first user to the previously concluded event, the check-in operation informing one or more second users in a social graph with the first user that the first user was at the previously concluded event.

These and other aspects may provide one or more of the following advantages. A user who would otherwise check-in to a visited place of interest may forgo the check-in and perform a check-in at a later time based on a token or other document or receipt received from an event at the place of interest. Accordingly, the user does not need to access or have handy a mobile device to perform the check-in. Additionally, the user is afforded the opportunity to review tokens collected during a journey, and may be more selective in which places of interest to share with others in a social network based on the entire journey.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

A computing device (for example, a smart phone or social media server) may be integrated with a check-in feature that enables a user of a social network to send an indication (for example, an announcement, message, or the like) to members of the user's social graph, informing the members that the user is visiting, or has visited, a place of interest (for example, a business establishment) at or near the user's current or past geographic location. As will be described further, the user may not required to be at the geographic location to perform a check-in. Rather, the subject technology enables the user to use tangible or intangible information collected while at an event at the place of interest to later perform a modified social media check-in, indicating that that the user visited the place of interest. Accordingly, users may assert their attendance to others within a social network at their convenience.

Figure 1:
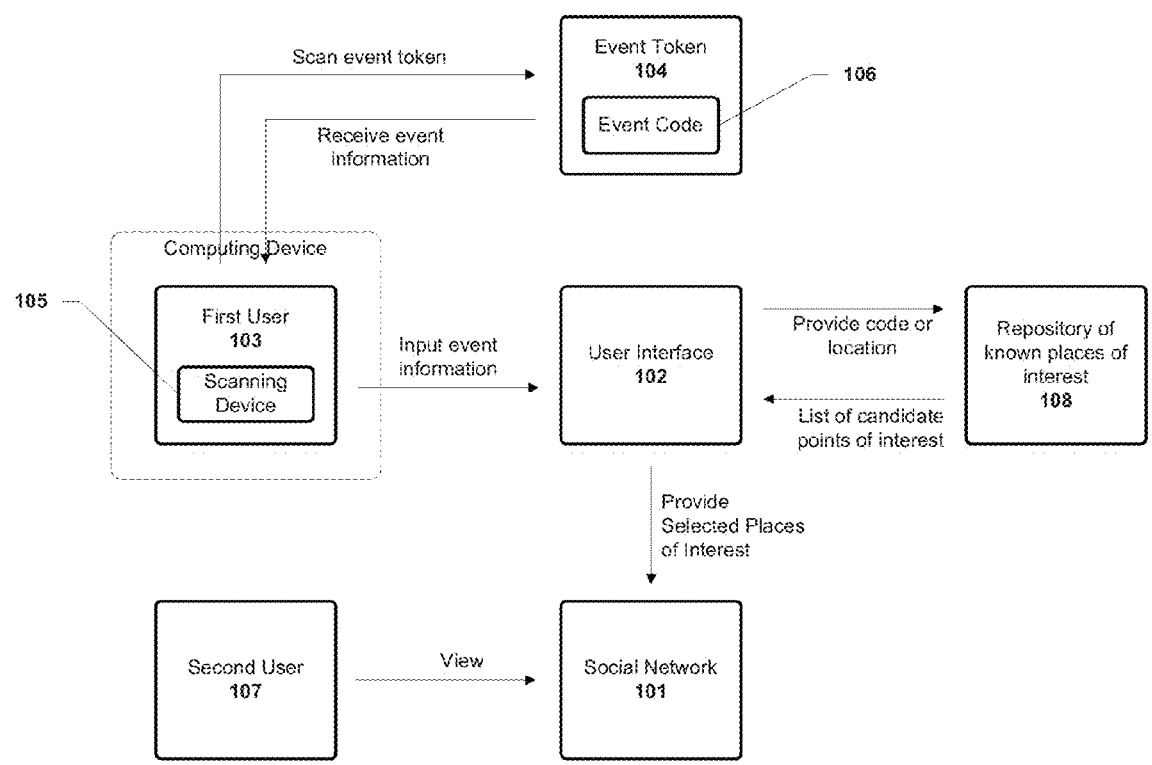
FIG. 1 is a diagram of an example system for indicating to members of a social network that a user previously visited a place of interest based on a token obtained from an event at the place of interest.

FIG. 1 is a diagram of an example system for indicating to members of a social network that a user previously visited a place of interest based on a token obtained from an event at the place of interest according to one aspect of the subject technology. A modified online social network 101 provides a deferred check-in interface 102 for enabling a user 103 of social network 101 to "check-in" to a previously visited location. In this respect, deferred check-in interface 102 accepts input of event information related to an event attended at the previously visited location. In some aspects, the event information may be read from an event token 104.

During a journey, user 103 may collect one or more event tokens 104. Example event tokens 104 may include, for example, a movie ticket, receipt or other paper document with an event code (for example, a "quick response" code) printed thereon. Event tokens 104 may also include digital tokens, for example, emailed receipts, digital signatures, or other digital information received by a computing device. Event token 104 corresponds to an event attended by user 103. Events may include any event in which the user attends or participates and can be memorialized. Without limitation, an event may include attending a movie at a movie theater, or a play, visiting a theme park or place of recreation (for example, a public beach), or the like. An event may include making a purchase at a business establishment. Event token 104 memorializes the event and provides event information that is usable by interface 102 to facilitate the check-in feature of the subject technology.

In some aspects, a computing device (for example, a smartphone, personal or notebook computer, tablet computer, PDA, augmented-reality glasses, or a television or other display device with one or more computing devices embedded therein or attached thereto) associated with user 103 may include a scanning device 105. User 103 may use scanning device 105 to read and store an event code 106 printed on event token 104. Event code 106 facilitates the transfer of event token 104 from its real-world embodiment to a digital form. Accordingly, event token 104 may be a digital token (for example, a digital signature stored on a mobile device) that is received by scanning event code 106, input at interface 102, or received by wireless transmission to the computing device associated with user 103.

In one example, scanning device 105 is a NFC reader embedded within the computing device. During a visit to a business establishment, scanning device 105 may receive transmission of event token 104 as digital information electronically transmitted from a point-of-sale terminal. In another example, scanning device 105 is a barcode reader and event token 104 is represented by a barcode. On reading the barcode, scanning device 105 receives a corresponding digital token, which is then stored on the computing device. Similarly, scanning device 105 is not limited to reading barcodes, but may read or recognize other types of identifiers associated with an event. Scanning device 105 may employ image recognition to identify images or objects associated with an event. Scanning device 105 may be implemented by a camera associated with the user's computing device. In a further implementation, scanning device 105 is substituted with a text input box on an interactive interface displayed by the computing device, for input of an event code.

On completion of a journey, user 103 may use deferred check-in interface 102 to input one or more event tokens 104 received during the journey. Interface 102 may be one or more web pages implemented by social network 101, or may be implemented as one or more controls integrated with certain aspects of social network 101 (for example, one or more input fields or selectable drop down lists provided in connection with an activity stream).

Interface 102 may include stand-alone software installed on a computing device (for example, a mobile device used by user 103). In this aspect, interface 102 may function to receive event tokens 104 and to upload the received tokens to a central server for the check-in feature of the subject technology. For example, when installed on a mobile device (for example, a smart phone, tablet or notebook computer, personal computer, PDA, or the like), interface 102 may configure a camera integrated with the mobile device to function as a barcode reader. In another example, interface 102 operates an integrated NFC reader. Either of these readers may be used to receive and store one or more event tokens 104 over the course of a journey. Interface 102 may then provide certain screens for selecting certain event tokens, and to check-in to one or more corresponding places of interest visited in the past. On check-in, a place of interest is shared with one or more second users 107 in social network 101 as if first user 103 had checked in to the place of interest while visiting the place of interest.

In one aspect, the event information may be input in connection with a message posted to a message stream. When constructing the message, user 103 selects a control for input of the event information in connection with the message.

On receiving an event token 104, a computing device associated with the deferred check-in interface 102 determines one or more candidate places of interest based on the event information, and displays the one or more candidate places of interest to the user. A candidate place of interest may be a tangible establishment or institution or an event at a geographic location. Likewise, event token 104 may correspond to a single place of interest, or multiple places of interest at a single geographic location.

In one aspect, event token 104 includes an event code 106 that is cross-referenced to a corresponding candidate place of interest. Event lookup software associated with interface 102 may, for example, search a repository 108 for known places of interest (for example, businesses, recreation centers, or the like) using the event code. In one aspect, repository 108 may cross reference event code 106 to a geographic location or coordinate. A central server may retrieve the geographic location from repository 108 based on event code 106, and then query a social media check-in service using the location to retrieve one or more candidate places of interest proximate to the location.

Candidate places of interest are displayed at interface 102. A display of a candidate place of interest may simply be a display of event information provided by event token 104 or event code 106. For example, the display of a place of interest may include the name of a business establishment or event at a visited location. Interface 102 may request that a user confirm the event information by selecting a candidate place of interest for a social media check-in. On selection of a candidate place of interest, the selected place of interest, including event information, is shared with other users 107 in social network 101 (for example, in a message stream). In other aspects, where an event token 104 does not provide enough information for the subject technology to reliably predict the place of interest, interface 102 may provide multiple candidate places of interest to the user. User 103 may then select one or more selected places of interest from the one or more candidate places of interest (for example, determined to be in the vicinity of a geographic location corresponding to the event information). A selected place of interest may then be provided, through social network 101, for display to other users 107 of a social network. User 103 may also add additional event information to provide users 107 a more detailed account of the selected place of interest.

On receiving from user 103 one or more selected places of interest, a representation of the user and the selected (previously visited) places of interest may be provided for display in the social network. For example, the representation may include a character description of the one or more selected places of interest together with a user identifier such as the user's name, picture, or other likeness of the user. In one example, the representation may be a message posted to a message stream, viewable by other users in the user's social graph. User 103 may return to the representation in social network 101 and add, update, or change information pertaining to the check-in, or delete the check-in, at the user's discretion.

Figure 2:
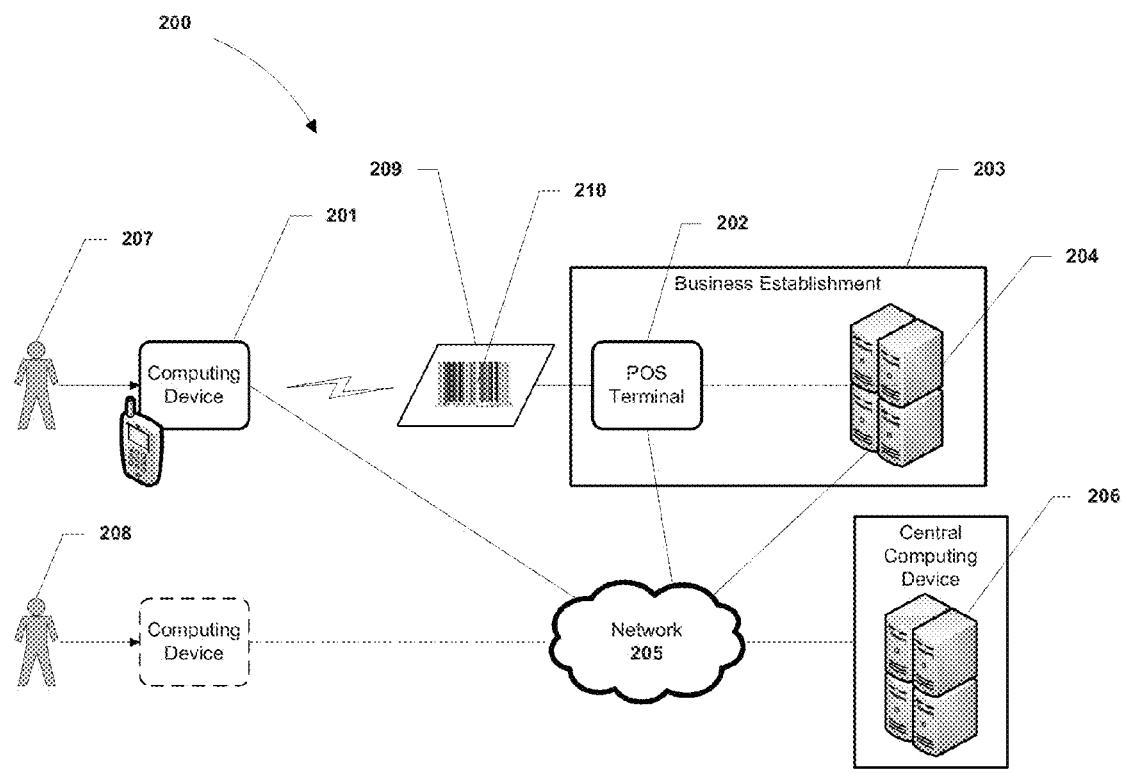
FIG. 2 is a diagram of a system for indicating to members of a social network that a user previously visited a place of interest based on a token obtained from an event at the place of interest.

FIG. 2 is a diagram of a system 200 for indicating to members of a social network that a user previously visited a place of interest based on a token obtained from an event at the place of interest according to one aspect of the subject technology. A system 200 may include a personal computing device 201 (for example a smartphone, GPS navigation device, or other mobile device, personal or notebook computer, tablet computer, PDA, augmented-reality glasses, or a television or other display device with one or more computing devices embedded therein or attached thereto), and a point-of-sale (POS) terminal 202 at or associated with a business establishment 203. POS terminal 202 may be connected to a business server 204 for processing of business transactions. In some aspects, computing device 201, POS terminal 202, and business server 204 may be operably connected over a network 205 (for example, a local or wide area network, Wi-Fi network, cellular network, the Internet, or the like).

Computing device 201 is also operably connected to a central computing device 206 (for example, one or more servers) over network 205. Central computing device 206 may be configured to provide a social network or other software interface for enabling one or more first users 207 to perform a check-in to a previously visited location, and for notifying one or more second users 208 of the check-in. For example, central computing device 206 may be configured to provide one or more application programming interfaces (APIs) for the integration of mobile-to-web extension applications. Additionally, the social network provided by central computing device 206 may include a social check-in application that allows users of the social network to "check in" to a physical place using computing device 201, and share their location with their friends or contacts in a social graph.

When a user 207 (for example, a customer of a business establishment) makes a purchase, POS terminal 202 provides user 207 with an event token 209, including a code 210 (for example, a barcode or sequence of numbers, letters, and/or symbols). In the depicted example, event token 209 is a receipt received for a purchase made at business establishment 203. Accordingly, code 210 may specify a purchase code and/or the time and location of the purchase. Code 210 may also be barcode (for example, a matrix barcode) that includes an alphanumeric code or other information that corresponds to an event for which event token 209 was received. User 207 (for example, a ticket holder) may retain event token 209 after the purchase and, at a later date and time, scan the barcode using the previously described deferred check-in interface to provide the event information, including the event (for example, the name of a movie), event location (for example, a specific theater), and time of the event, to central computing device 206.

User 207 may also enter or scan code 210 using his or her computing device 201, and device 201 may be configured to send the code 210, or information derived there from, to central computing device 206. For example, device 201 may send code 210 to central computing device 206 over network 205. In another aspect, user 207 may text code 210 to a predetermined location (for example, phone number) printed on event token 209. In another example, an alphanumeric code may be printed on the token. User 207 may then manually input the alphanumeric code into an input field of the previously described deferred check-in interface.

The scanning and/or sending of code 210 may cause user 207 to "check-in" to business establishment 203. A representation of the user and the check-in is then provided to users 208 in a social graph with user 207, for example, as a post viewable in an activity stream.

In some implementations, users 207 (for example, as customers or event patrons) may be incentivized to share event information from event tokens with other users in the social network. If user 207 has "opted-in" to third-party offerings, a third-party sponsor of the event may provide one or more offerings (for example, a coupon or other discount) to the user in exchange for sharing the event in the social network. In this regard, an event token 209 may be received by computing device 201 when first user 207 is authenticated to a user account. Central computing device 206 determines, in response to receiving a selected one or more selected places of interest, one or more offerings, and then provides the offerings to the user of the user account (for example, by email or social media message). In one example, the offering may include a monetary value that is credited to the user account.

In some implementations, user 207 may store one or more event tokens 209 in digital form on client computing device 201 or central computing device 206 without performing a check-in. In this manner, user 207 may upload event tokens 209 over a period of time, and, at a later date, choose which places of interest that the user has visited to share with other users. User 207 may, for example, on authenticating to social network 101 after completing a journey, select one or more stored event tokens 209 to search for corresponding candidate places of interest, or select one or more candidate places of interest that were determined offline based on previously uploaded event tokens 209. In some aspects, social network 101 may remove event tokens or corresponding selected places of interest once they have been selected for check-in, or social network 101 may allow users to store, archive, organize and repeat check-ins. For example, social network 101 may provide one or more webpages that provide a digest of all the places of interest that the user has visited for the past year, or all the places in a specific city which the user has visited. Accordingly, the digest may be organized or sorted by time or place.

The various connections between personal computing device 201, POS terminal 205, business server 204, central computing device 206, and/or network 205 may be made over a wired or wireless connection. The functionality of central computing device 206 may be implemented on a single server or distributed among a plurality of servers or other computing devices. The functionality of central computing device 206 may also be included in personal computing device 201 or business server 204 such that an independent server or set of servers is not necessary to carry out the aspects of the subject technology, but, rather, may be implemented by a system of one or more distributed computing devices.

Figure 3:
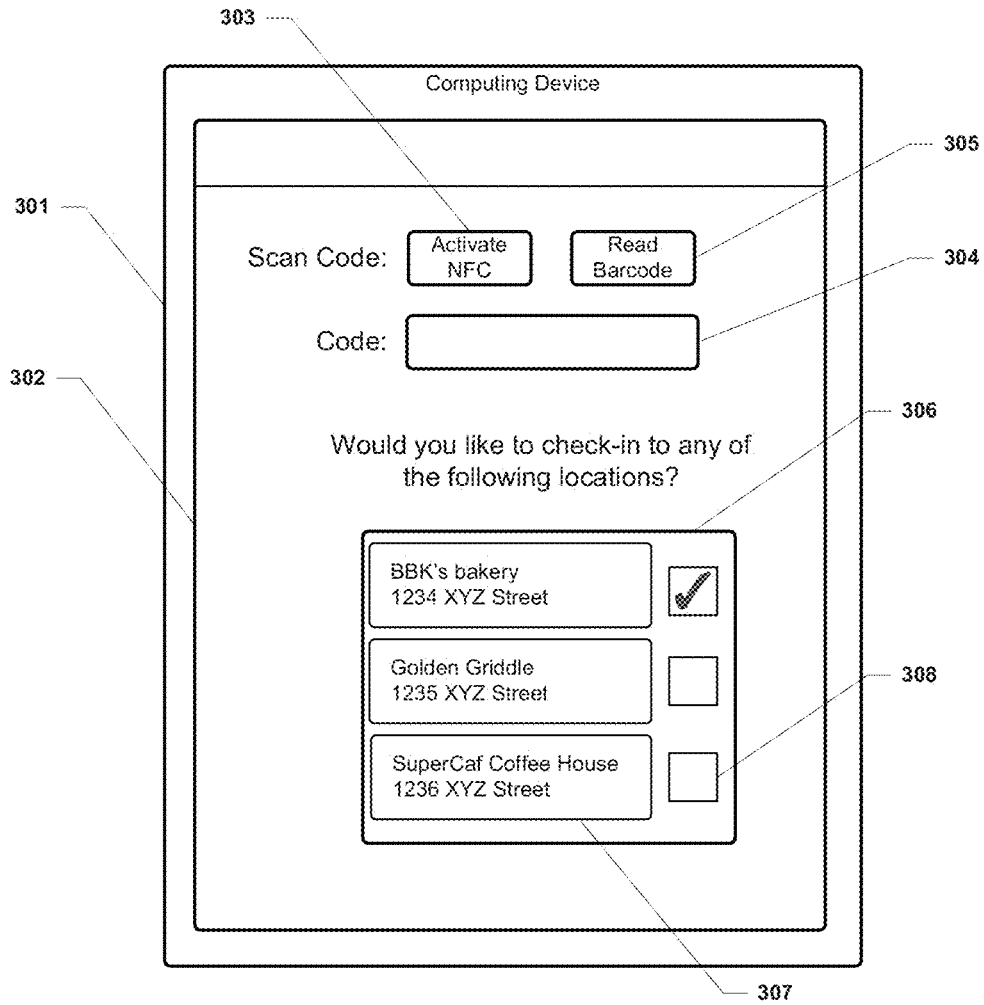
FIG. 3 depicts an example computing device, including a user interface for selecting previously visited locations.

FIG. 3 depicts an example computing device 301, including a user interface 302 for selecting previously visited locations, according to the subject technology. Interface 302 may include one or more controls for inputting an event code. For example, interface 302 may include a first control 303 that activates an NFC reader associated with computing device 301. On activation, the NFC reader reads a NFC device that includes digital information related to an event. In some aspects, the digital information may include an event code, which may be viewed in a text box 305 displayed on user interface 302. Text box 304 may also function to receive manual input of a alphanumeric event code. Additionally or in the alternative, interface 302 may include a second control 305 that activates a barcode reader associated with computing device. On activation, the barcode reader reads a barcode that includes the event code.

On input of an event code, a selection list 306 of one or more candidate places of interest 307 may be displayed along with a request for a user to select one or more places from the list that the user visited. In one example, each candidate place of interest 307 listed may be associated with a selection box 308 so that the user may select which places were visited, and omit other suggestions offered by the system. On selection of one or more candidate places of interest (for example, from the previously described list), the system may perform a check-in operation and/or post one or more messages to a message stream of a social network, informing other users that the user visited the one or more candidate places of interest.

Figure 4:
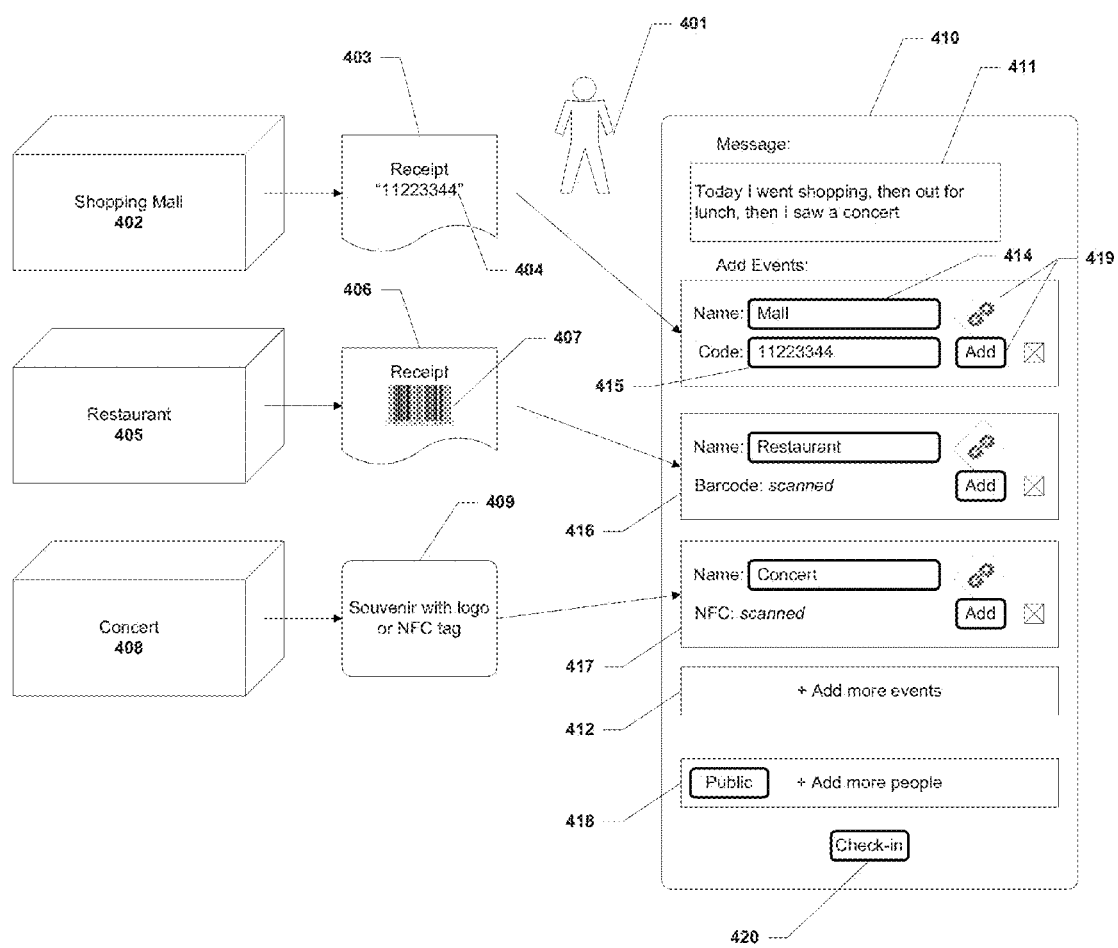
FIG. 4 depicts a user interface for sharing multiple locations previously visited by a user in a social network.

FIG. 4 depicts a user interface for sharing multiple locations previously visited by a user in a social network, according to the subject technology. Event tokens are collected by a user 401 in various forms over a period of time (for example, a 24 hour period, one or more days, or the like). In the depicted example, user 401 goes shopping at a shopping mall 402, and receives a first receipt 403. First receipt 403 includes an event code number 404 for a future check-in to shopping mall 402 or the business that provided the receipt. User 401 then goes to lunch at a restaurant 405, and receives a second receipt 406. Second receipt 406 includes a "quick response" code or barcode 407 printed thereon for a future check-in to restaurant 405. User 401 then attends a concert 408, and receives a souvenir 409 that includes an embedded NFC tag. The NFC tag includes an event code or other information that identifies concert 408 for a future check-in to concert 408.

At the end of the period of time during which the previously described receipts were collected, user 401 accesses a user interface 410 for selecting and sharing previously visited locations. User interface 410 includes a text box 411 for entry of an message (for example, alphanumeric message) to be shared to other users of an online social network (for example, a message post to users in a social graph with user 401). User interface 410 further includes a first control 412 for the addition of one or more event inputs. A first event input 413 include includes a name field 414 and a code field 415. Name field 414 is provided for identification of a place of interest corresponding to a code entered into code field 415. Name field 414 may be automatically populated based on a code entered into code field 415. In some implementations, an event input automatically detects a scanning of a barcode or NFC code from an associated scanner or reader, and automatically enters the scanned code into code field 415. In other implementations, first control 412 enables user 401 to select the type of mechanism for entry of the code (for example, by alphanumeric entry or scanning).

In the depicted example, user 401 types a message into text box 411, types event code number 404 into code field 415, and then uses first control 412 to add a second event input 416. User 401 scans barcode 407 to automatically provide an event code for restaurant 405, and then adds a third event input 417 using first control 412. User 401 uses an NFC reader to electronically read the NFC tag associated with souvenir 409 (for example, by tapping a handheld device that includes the NFC reader to souvenir 409). User 401 may then access a second control 418 to designate one or more users of social network for sharing message 411, the events entered, and other information input at user interface 410.

In some aspects, the previously described event inputs may further include one or more attachment controls 419 for associating one or more electronic documents (for example, one or more digital photos or videos) with a deferred check-in place of interest. User interface 410 may also include a check-in control 420 (for example, a submit button) to perform an automatic check-in and sharing of the previously visited locations. In the depicted example, user 401 activates check-in control 420 to perform a deferred check-in to shopping mall 402, restaurant 405, and concert 408, and to share the deferred check-ins with the users designated by second control 418.

Figure 5:
FIG. 5 depicts a webpage, including an example viewing mechanism for displaying locations previously visited by a user in a social network.

FIG. 5 depicts a webpage 501, including an example viewing mechanism for displaying locations previously visited by a user in a social network, according to the subject technology. In one example, the previously described selected places of interest may be displayed as one or more messages 502 in a message stream 503. The one or more messages 502 may be displayed in the message stream at a time corresponding to a time that the user visited the place of interest, or, as depicted, may be grouped together, informing users that, for example, the user "visited [Place A], [Place B], and [Place C]."

While the previously described viewing mechanisms are displayed together in the depicted example webpage 501, it should be understood that many implementations of webpage 501 may display only one mechanism. For example, a social network may display the locations grouped together in a message stream visible on one webpage, but display either the previously described electronic map or list view on one or more other webpages.

Figure 6:
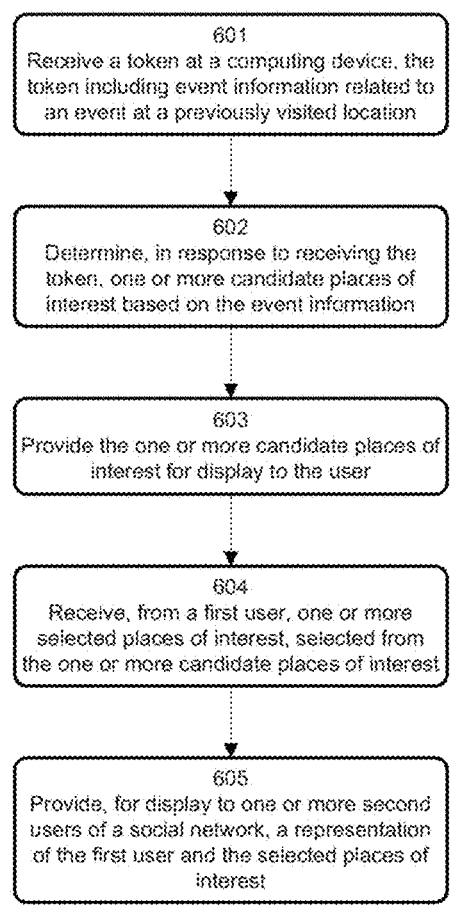
FIG. 6 is a flowchart illustrating an example process for indicating to members of a social network that a user previously visited a place of interest based on a token obtained from an event at the place of interest.

FIG. 6 is a flowchart illustrating an example process for indicating to members of a social network that a user previously visited a place of interest based on a token obtained from an event at the place of interest according to one aspect of the subject technology. According to some aspects, the blocks of FIG. 6 may be executed by one or more computing devices (for example, a desktop or server computer, tablet or notebook computer, personal data assistant, smart phone, a television or other display device with one or more computing devices embedded therein or attached thereto, or the like). In this regard, the blocks of FIG. 6 may be performed within the context of an online social network application provided by the one or more computing devices.

In block 601, a token is received at a computing device, the token including event information related to an event at a previously visited location. As described previously, a token can be received in a digital or tangible form. In one implementation, the computing device is a mobile computing device associated with a user. The token may be a document or portion of a document related to the event. The camera integrated with the mobile device is activated as a scanner. When the document is positioned in front of the camera, the camera electronically reads the token. The token may include, for example, a barcode, wherein the integrated camera reads the barcode to read the event information, and electronically stores the event information in a memory associated with the computing device.

In a second implementation, the token is received over a wireless signal transmitted from a near field transmitter. In this respect, the user may position a near field communication (NFC) device embedded within the computing device near a radio-frequency identification (RFID) transmitter, the RFID transmitter transmitting the event information. The event information may then be received into the computing device using the NFC device.

In a third implementation, the token is received at an interactive user interface provided by a computing device. One or more input controls for receiving the event information may be provided to a user in connection with an activity stream. The user may provide the event information by manipulation of the one or more input controls. For example, the user may enter a code related to the event in connection with a user-provided message posted to the activity stream. In this implementation, the computing device may alternatively be a server device associated with the social network, and the server may provide the interactive user interface for display at a computing device associated with the user.

In block 602, in response to receiving the token, one or more candidate places of interest are determined based on the event information. In this respect, the event information includes a code, which is then used to index a plurality of records corresponding to respective events, to identify at least one candidate event. The plurality of records may be stored in a data repository (for example a database) associated with the previously described server device. On determining a candidate event, the server device may determine (for example, by further indexing) one or more establishments associated with the candidate event.

In block 603, the one or more candidate places of interest are provided for display to the user. The candidate places of interest may be displayed, for example, at the previously described interactive user interface or another interface provided by the computing device. In block 604, one or more selected places of interest are received from a first user. The one or more selected places of interest are selected from the one or more candidate places of interest. On receiving a selected place of interest, in block 605, a representation of the first user and the selected place of interest (for example, a character description of the one or more selected places of interest together with a user identifier such as the user's name, picture, or other likeness of the user) are provided for display to one or more second users of a social network (for example, in an activity stream or other social media notification).

Figure 7:
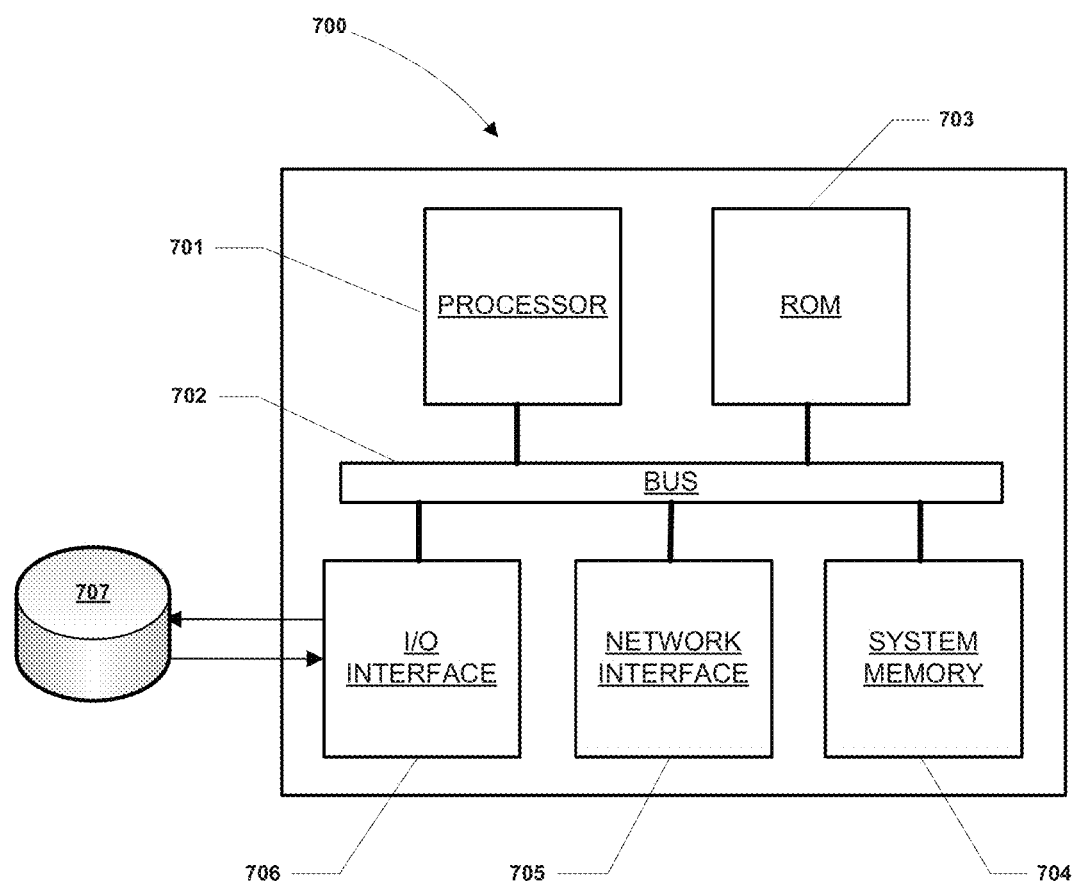
FIG. 7 is a diagram illustrating an example computing system for indicating to members of a social network that a user previously visited a place of interest based on a token obtained from an event at the place of interest, including a processor and other internal components.

FIG. 7 is a diagram illustrating an example computing system for indicating to members of a social network that a user previously visited a place of interest based on a token obtained from an event at the place of interest, including a processor and other internal components, according to one aspect of the subject technology. In some aspects, a computing device 700 (for example, personal computing device 201, central computing device 206, or the like) includes several internal components such as a processor 701, a system bus 702, read-only memory 703, system memory 704, network interface 705, I/O interface 706, and the like. In one aspect, processor 701 may also be communication with a storage medium 707 (for example, a hard drive, database, or data cloud) via I/O interface 706. In some aspects, all of these elements of device 700 may be integrated into a single device. In other aspects, these elements may be configured as separate components.

Processor 701 may be configured to execute code or instructions to perform the operations and functionality described herein, manage request flow and address mappings, and to perform calculations and generate commands. Processor 701 is configured to monitor and control the operation of the components in server 700. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 701. Likewise, one or more sequences of instructions may be software stored and read from ROM 703, system memory 704, or received from a storage medium 707 (for example, via I/O interface 706). ROM 703, system memory 704, and storage medium 707 represent examples of machine or computer readable media on which instructions/code may be executable by processor 701. Machine or computer readable media may generally refer to any medium or media used to provide instructions to processor 701, including both volatile media, such as dynamic memory used for system memory 704 or for buffers within processor 701, and non-volatile media, such as electronic media, optical media, and magnetic media.

In some aspects, processor 701 is configured to communicate with one or more external devices (for example, via I/O interface 706). Processor 701 is further configured to read data stored in system memory 704 and/or storage medium 707 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, a tablet computer, a television with one or more processors embedded therein or coupled thereto, PDA, smart phone, and the like.

In some aspects, system memory 704 represents volatile memory used to temporarily store data and information used to manage device 700. According to one aspect of the subject technology, system memory 704 is random access memory (RAM) such as double data rate (DDR) RAM. Other types of RAM also may be used to implement system memory 704. Memory 704 may be implemented using a single RAM module or multiple RAM modules. While system memory 704 is depicted as being part of device 700, those skilled in the art will recognize that system memory 704 may be separate from device 700 without departing from the scope of the subject technology. Alternatively, system memory 704 may be a non-volatile memory such as a magnetic disk, flash memory, peripheral SSD, and the like.

I/O interface 706 may be configured to be coupled to one or more external devices, to receive data from the one or more external devices and to send data to the one or more external devices. I/O interface 706 may include both electrical and physical connections for operably coupling I/O interface 706 to processor 701, for example, via the bus 702. I/O interface 706 is configured to communicate data, addresses, and control signals between the internal components attached to bus 702 (for example, processor 701) and one or more external devices (for example, a hard drive). I/O interface 706 may be configured to implement a standard interface, such as Serial-Attached SCSI (SAS), Fiber Channel interface, PCI Express (PCIe), SATA, USB, and the like. I/O interface 706 may be configured to implement only one interface. Alternatively, I/O interface 706 may be configured to implement multiple interfaces, which are individually selectable using a configuration parameter selected by a user or programmed at the time of assembly. I/O interface 706 may include one or more buffers for buffering transmissions between one or more external devices and bus 702 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
    receiving a token at a computing device based on a reading of a barcode using a barcode scanner or receiving near field communication (NFC) information using a NFC device, the token including event information referencing a previously concluded event at a location previously visited by a first user, the previously visited location being a different location than a current location of the computing device;
    determining, in response to receiving the token, one or more candidate places of interest associated with the previously visited location based on the event information;
    providing the one or more candidate places of interest for display to the first user;
    receiving, from the first user, one or more selected places of interest, selected from the one or more candidate places of interest; and
    providing, for display to one or more second users of a social network, a representation of the first user and the one or more selected places of interest.

2. The computer-implemented method of claim 1, wherein receiving the token comprises:
    activating an integrated camera associated with the computing device as the barcode scanner;
    waiting for the barcode to be viewed by the integrated camera; and
    on the integrated camera viewing the barcode, electronically reading the barcode to read the event information, and electronically storing the event information in a memory associated with the computing device.

3. The computer-implemented method of claim 1, wherein the NFC device is embedded within the computing device, and wherein receiving the token comprises:
    positioning the NFC device near a radio-frequency identification (RFID) transmitter, the RFID transmitter transmitting the token; and
    receiving the token into the computing device using the NFC device.

4. The computer-implemented method of claim 1, wherein receiving the token comprises:
    providing to a user, in connection with a graphic user interface, an input for receiving the event information; and
    receiving, at the input, the event information in the form of a user-provided code.

5. The computer-implemented method of claim 1, wherein receiving the token comprises:
    providing to a user, in connection with an activity stream, one or more input controls for receiving the event information; and
    receiving, at the one or more input controls, the event information in connection with a user-provided message posted to the activity stream.

6. The computer-implemented method of claim 1, wherein the event information includes a code, and wherein determining one or more candidate places of interest comprises:
    indexing, using the code, a plurality of records corresponding to respective events to identify at least one candidate event.

7. The computer-implemented method of claim 6, further comprising:
    determining, from the at least one candidate event, one or more establishments associated with the event.

8. The computer-implemented method of claim 1, wherein the token is received in connection with a user account, the method further comprising:
    determining, in response to receiving the one or more selected places of interest, one or more offerings; and
    providing the one or more offerings to a user of the user account.

9. The computer-implemented method of claim 1, wherein the computing device is a mobile computing device associated with a user.

10. The computer-implemented method of claim 1, wherein the computing device is a server associated with the social network.

11. The computer-implemented method of claim 1, wherein the representation is provided as one or more posts to a message stream.

12. A non-transitory machine-readable medium having instructions stored thereon that, when executed, cause a machine to perform a method, the method comprising:
    receiving an event code referencing a previously concluded event, the event code being received based on a scanning of a barcode using a barcode scanner or receiving near field communication (NFC) information using a NFC device;

determining, based on the event code, the previously concluded event;

receiving, from a user, confirmation that the user was at the previously conducted event referenced by the event code; and providing, for display to other users of a social network, a representation of the user and the previously conducted event.

13. The machine-readable medium of claim 12, wherein receiving the event code comprises:

activating an integrated camera associated with a computing device as the barcode scanner;

waiting for the barcode to be viewed by the integrated camera; and on the integrated camera viewing the barcode, electronically reading the barcode to read the event code, and electronically storing the event code in a memory associated with the computing device.

14. The machine-readable medium of claim 12, wherein receiving the event code comprises:

positioning the NFC device near a radio-frequency identification (RFID) transmitter, the RFID transmitter transmitting the event code; and receiving the event code into a computing device using the NFC device.

15. The machine-readable medium of claim 12, wherein the event code is received at an interactive user interface provided by a computing device.

16. The machine-readable medium of claim 12, wherein the event code is received from multiple users of the social network, the method further comprising:

associating, in the social network, the multiple users with the previously concluded event; and displaying the association in one or more activity streams.

17. The machine-readable medium of claim 12, wherein the event code is received in connection with a user account, the method further comprising:

determining, in response to receiving the confirmation, one or more offerings for a user of the user account; and providing the one or more offerings to the user of the user account.

18. The machine-readable medium of claim 12, wherein the event code is received at a mobile computing device associated with the user.

19. The machine-readable medium of claim 12, wherein the event code is received at a server device associated with the social network, the server device receiving the event code over a network from a mobile computing device associated with the user.

20. A system, comprising:

a processor; and a memory including instructions that, when executed by the processor, cause the processor to facilitate the steps of:

receiving a digital token based on a reading of a barcode using a barcode scanner or receiving near field communication (NFC) information using a NFC device, the digital token comprising information referencing a previously concluded event;

determining, based on the information, the previously concluded event;

receiving, from a first user, confirmation that the first user was at the previously conducted event referenced by the information; and providing, to a modified social media check-in service, an instruction to check-in the first user to the previously concluded event, a check-in operation responsive to the instruction informing one or more second users in a social graph with the first user that the first user was at the previously concluded event.

* * * * *